United States Patent [19]
Dixon et al.

[11] Patent Number: 6,118,782
[45] Date of Patent: *Sep. 12, 2000

[54] ASYNCHRONOUS TRANSFER MODE NETWORK

[75] Inventors: Michael Joseph Dixon, Cambridge; Ian Malcolm Atkinson, Newmarket, both of United Kingdom

[73] Assignee: FORE Systems, Inc., Warrendale, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,829

[22] Filed: Jun. 20, 1997

[30] Foreign Application Priority Data

Jun. 24, 1996 [GB] United Kingdom ............... 9613212

[51] Int. Cl.$^7$ .................................................. H04L 12/28
[52] U.S. Cl. ........................................ 370/389; 370/395
[58] Field of Search ..................... 370/229, 230, 370/395, 397, 401, 412, 428, 429, 465, 468, 389, 392, 394, 399, 400, 409

[56] References Cited

U.S. PATENT DOCUMENTS

| | | | |
|---|---|---|---|
| 5,115,427 | 5/1992 | Johnson, Jr. et al. | 370/375 |
| 5,469,432 | 11/1995 | Gat | 370/389 |
| 5,534,941 | 7/1996 | Sie et al. | 348/564 |
| 5,802,056 | 9/1998 | Ferguson et al. | 370/403 |
| 5,809,024 | 9/1998 | Ferguson et al. | 370/395 |
| 5,812,525 | 9/1998 | Teraslinna | 370/229 |
| 5,933,607 | 8/1999 | Tate et al. | 370/395 |

*Primary Examiner*—Chau Nguyen
*Assistant Examiner*—Chiho Andrew Lee
*Attorney, Agent, or Firm*—Ansel M. Schwartz

[57] ABSTRACT

The present invention relates to an Asynchronous Transfer Mode (ATM) network, and in particular to a system and a method for a number of ATM devices to share the facilities provided by a single ATM switch port. An ATM switch has a number of switch ports which may receive and transmit the data comprising information and a routing identifier. A number of ATM devices are connected in series to each other in a device chain, and at the ends to the chain to a first ATM port. The devices are adapted to distinguish between the information and the routing identifier and may receive and transmit information through the chain, with a first or head device receiving data from the ATM port and the last device transmitting data to the ATM port. A control computer is connected to a second ATM port and may be programmed with the identities of the ATM devices and communicate through the first switch port with a device in the device chain. Each ATM device may be programmed with mapping instructions so that data subsequently received by the device may be correctly routed according to the routing identifier.

11 Claims, 3 Drawing Sheets

ASYNCHRONOUS TRANSFER MODE NETWORK

FIELD OF THE INVENTION

The present invention relates to an Asynchronous Transfer Mode (ATM) network, and in particular to a system and a method for a number of ATM devices to share the facilities provided by a single ATM switch port.

BACKGROUND OF THE INVENTION

ATM switches are used for routing data packets or signals through an ATM network. The ATM switch has a number of ports which may be connected to a device, such as another ATM switch or a peripheral device such as a computer, a video feed device, or a telecommunications device, each of which has a standard interface unit with a device port which may transmit and receive data packets from an ATM switch port. An example of a typical ATM switch is the model ASX-200 from Fore Systems, Inc. of Warrendale, Pa., USA.

An ATM switch port consists of a receive and a transmit interface. Each ATM device that connects to the switch also has a transmit and a receive interface. These interfaces each have a high bandwidth; 25 Mbits/s and 155 Mbits/s are the current standard data rates. However, many peripheral devices have a data rate much lower than this. For example, a video feed may have a data rate of 2 Mbits/s. There may therefore be a great deal of bandwidth unutilized on each ATM switch port.

One way to make better use of the bandwidth is to devise a way to connect a number of ATM devices to a single ATM switch port. One known way is to use "stacking" devices such as the product sold under the registered trade mark "CellStack" by K-NET Ltd. of Odiham, Hampshire, UK. However, many so-called "stacks" use a proprietary interconnect technology with one device in the stack being nominated as the interface unit according to the standard network format. It may therefore not be possible to redeploy the stacked devices, for example to connect each device to a single ATM switch port.

Another solution to the problem of under utilized bandwidth is the so-called "backplane" or "chassis" based approach for interfacing a number of different device types to the same network interface. However, when purchasing a chassis solution the customer has to estimate the final size of a desired configuration. It is also possible that the chassis "slots" purchased may be incompatible with later interfaces developed by the manufacturer.

SUMMARY OF THE INVENTION

It is an object of the present invention to provide a more flexible arrangement allowing a number of ATM devices to share the facilities offered by a single ATM switch port in order to improve the utilization of bandwidth on the ATM switch port.

Accordingly, the invention provides a network for routing data, the data comprising information and a routing identifier, the network comprising:

a) an ATM switch, the switch having a number of switch ports which may receive and transmit the data;

b) a number of ATM devices including a head device and a last device, the devices each having a device port which may transmit and receive data and each being adapted to distinguish between the information and the routing identifier, the devices being connected in series to each other in a device chain and to a first switch port so that the first-switch port may transmit data to a head device and receive data from a last device and so that data may be transmitted from the head device through to any succeeding device; and c) a controller which may be programmed with the identities of the ATM devices and which may communicate through the first switch port with a device in the device chain;

in which an ATM device may be programmed with mapping instructions so that data subsequently received by the device may be correctly routed according to the routing identifier.

The controller may be built into the ATM switch, however, this would entail the use of a non-standard ATM switch. Therefore, it is preferable if the controller is separate, for example a free-standing control computer which may communicate with a second ATM switch port and which may be programmed with the identities of the ATM devices.

The control computer in most cases may be local with the devices and the ATM switch and connected directly with the second switch port on the ATM switch. However, the controller may be distant from the ATM switch. An equivalent arrangement to that with just one ATM switch is that in which the control computer is connected indirectly to the second switch port via another ATM switch. For example the control computer may be connected to a switch port on another remote ATM switch, which has a switch port connected to the above-mentioned second switch port.

Preferably, the controller may interrogate the device chain in order to determine the identities of the devices, for example in order to determine both the number and the type or functionality of each device.

The mapping instructions may be programmed remotely, for example by the controller, with information transmitted to the device chain through the ATM switch. Alternatively, the mapping instructions may be set manually at each device, for example being set by DIP switches.

It is particularly advantageous if the controller may transmit data with information comprising mapping instructions through the ATM switch to the head device, at least the head device being adapted to recognize the routing identifier as being valid or invalid, and in response to a valid routing identifier to store the mapping instructions so that data subsequently received by the device may be correctly routed according to the routing identifier.

If the network comprises a remote ATM device, the controller may be adapted to provision a virtual circuit between the remote device and a device in the device chain in order that data may be transmitted between the remote device and the device in the device chain.

The network may also comprise a concentrator or a number of concentrators. A concentrator is a device having a series of input and output ports, the ports being adapted to transmit data and being interposed between the first switch port and the device chain, so that data may be transmitted to and received from the device chain through the concentrator.

Also according to the invention, there is provided a method of routing data through a network, the data comprising information and a routing identifier, the network comprising:

a) an ATM switch, the switch having a number of switch ports which may receive and transmit the data;

b) a number of ATM devices including a head device and a last device, the devices each having a device port which may transmit and receive data and each being adapted to distinguish between the information and the routing identifier, the devices being connected in series to each other in a device chain and to a first switch port so that the first switch port may transmit data to a head device and receive data from a last device and so that data may be transmitted from the head device through to any succeeding device; and c) a controller which may be programmed with the identities of the ATM devices and which may communicate through the first switch port with a device in the device chain;

the method comprising the steps of:

i) programming the controller with the number, location and type of devices in the device chain; and ii) programming the devices in the device chain so that data destined for a particular device in the device chain may be received and acted upon by that device, and so that data not destined for a particular device may be transmitted onward by that particular device.

If the controller may interrogate devices in the device chain in order to determine the number and type of devices in the device chain, then the method may comprise before i) above the steps of:

iii) transmitting an interrogation data packet from the controller via the ATM switch to the device chain;

iv) receiving the data packet at each device in the device chain in turn, each device modifying information in the data packet to record its identity and count in the device chain, prior to onward transmission of the data pack;

v) transmitting the interrogation data packet from the last device in the device chain via the ATM switch to the controller; and vi) receiving the interrogation packet at the controller in order to program the controller.

If the devices in the device chain may be remotely programmed by the controller, then the method may comprise after step i) and before step ii) above the steps of:

vii) transmitting a mapping instruction from the controller via the ATM switch to a particular device in the device chain; and viii) receiving the mapping instruction at the particular device in the device chain in order to program the particular device.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
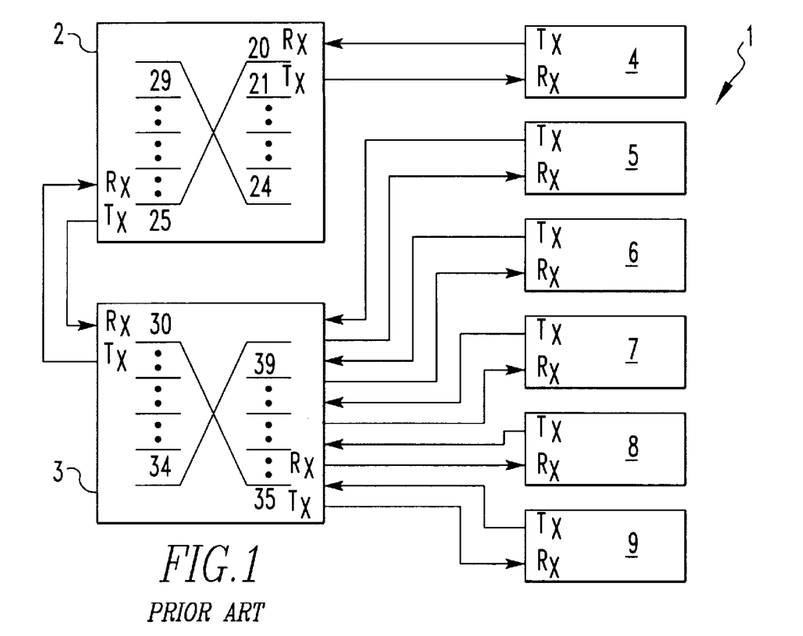
FIG. 1 is a block schematic view of a known ATM network.

Referring now to the drawings wherein like reference numerals refer to similar or identical parts throughout the several views, and more specifically to FIG. 1 thereof, there is shown an ATM network 1 comprising two ATM switches 2,3 each of which has a number of ATM ports, indicated respectively by the numerals 20–29 and 30–39. One of the ATM switches 2 has one port 20 which is connected to a remote ATM device 4 (for example, by a fibre optic link, not shown), and another port 25 which is connected to an ATM port 30 on the other ATM switch 3. The second ATM switch also has five ports 35–39 each of which is connected to one of five local ATM devices 5–9. Each ATM port, and each ATM device has the standard matched receive and transmit links comprising standard receive Rx and transmit Tx interfaces and electrical wires or optical fibers, drawn as arrows, through which data may be transmitted.

The devices 4–9 may each communicate with each other through one or more ATM switches in the known manner.

Whilst this standard arrangement provides good flexibility for system design or expansion the actual data rate on each link Rx,Tx will be limited by the data rate for each device 4–9, and will in general fall far below the standard maximum bandwidth data rates of 25 Mbits/s and 155 Mbits/s.

Figure 2:
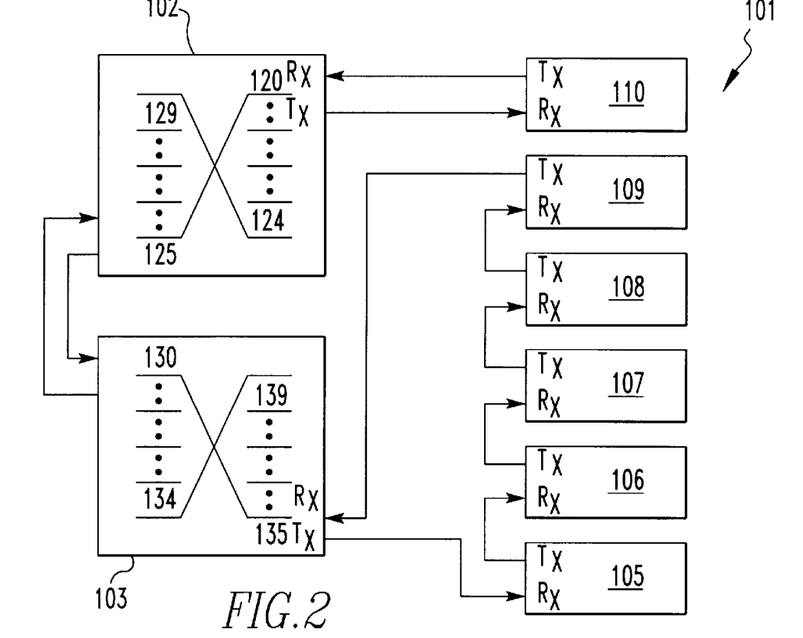
FIG. 2 is a is a block schematic view of an ATM network according to a first embodiment of the invention.

Turning now to FIG. 2, an ATM network 101 comprises two ATM switches 102,103 similar to those described above, each of which has a number of ATM ports 120–129 and 130–139. The switches are connected to each other and to a remote ATM device 104 in a similar manner to that described above.

The first ATM switch 102, however, is connected to a controller, which is in this example a control computer 110. In addition, the second ATM switch 103 has connected to one of its ATM ports 135 five local ATM devices 105–109 wired in series to form a arrangement referred to herein as a "device chain". The local devices are wired in the following manner: the transmit interface Tx on the ATM port 135 runs to the receive link interface Rx on a first device 105 of the five local ATM devices, referred to herein as a "head" device; the transmit interface Tx of the head device 105 is wired to the receive interface Rx on the second device 106; the transmit interface Tx of the second device 106 is wired to the receive interface Rx on the third device 107; the third 107, fourth 108 and fifth devices 109 are similarly wired in series; and the transmit interface Tx of the fifth device is then wired back to the receive interface Rx of the same ATM port 135, completing a series loop through all five ATM devices 105–109.

It is important to note that all five ATM devices each have a single standard ATM interface Rx,Tx, and the ATM switch 103 is a standard switch with a conventional ATM interface Rx,Tx.

Figure 3:
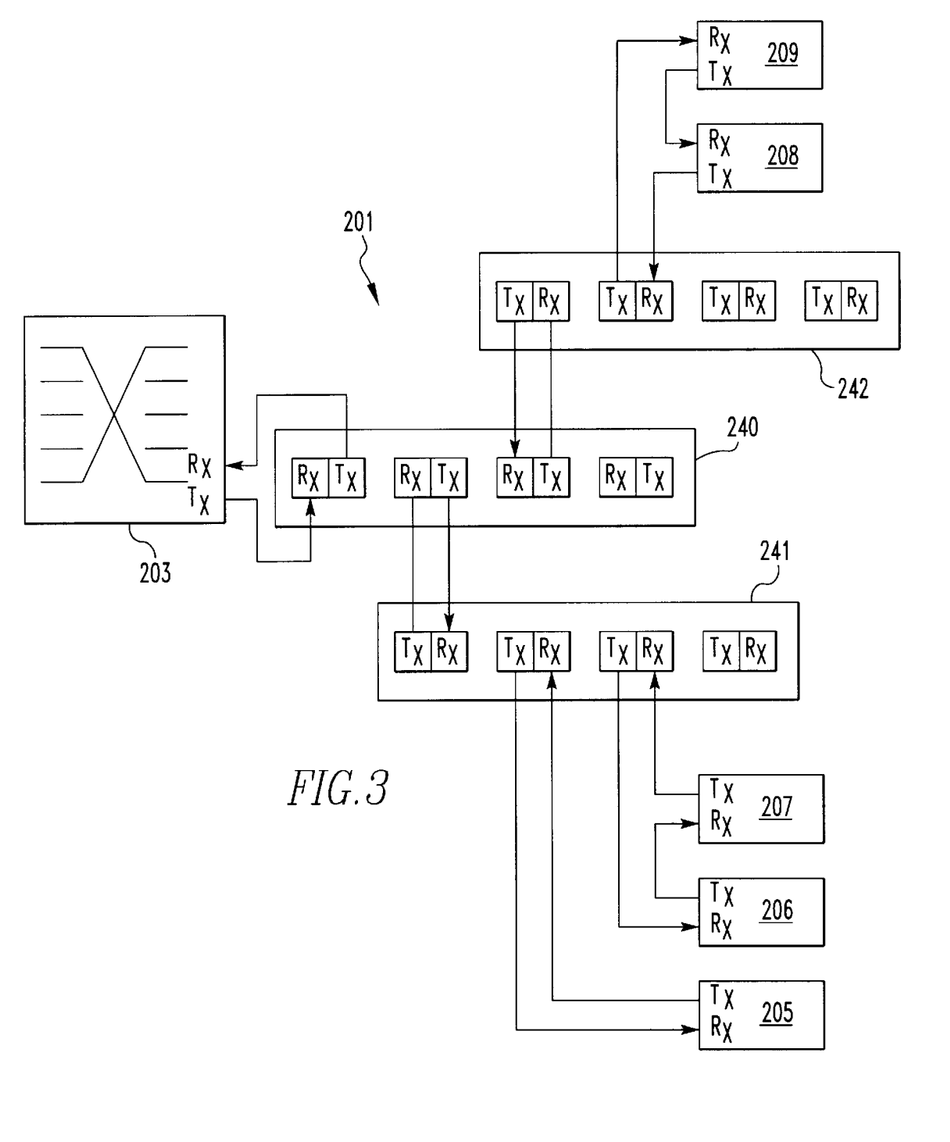
FIG. 3 is a block schematic view of an ATM network according to a second embodiment of the invention.
Figure 4:
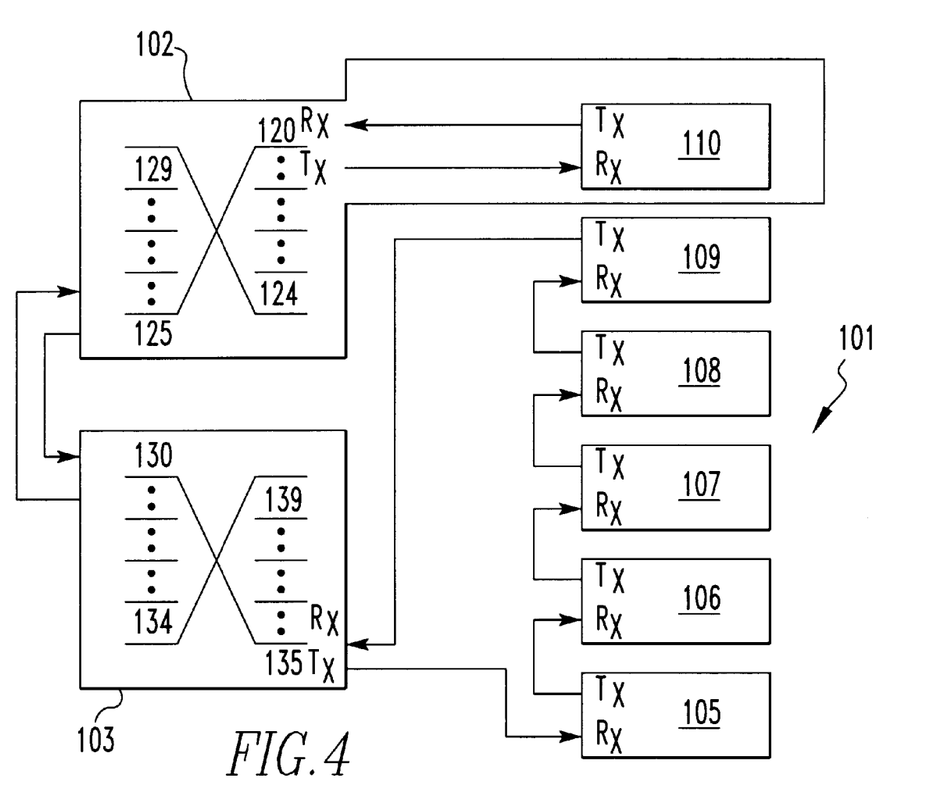
FIG. 4 is a block schematic view of an ATM network according to a second embodiment of the invention.

If one of the devices in the device chain should fail, the device chain will be broken. FIG. 3 illustrates a variant of the above ATM network arrangement, in which three concentrators 240,241,242 are used in order to improve the resilience of an ATM network 201 to the failure of any one of five local devices 205–209. Since apart from the two-deep concentrator arrangement, FIG. 3 is the same as FIG. 2, just one ATM switch 203 is shown, the second ATM, control computer and remote device are omitted from the drawing.

If concentrator 241 fails, then concentrator 240 and 242 will heal the device chain, and ATM device 208 and 209 will continue to be operational on the chain. If device 205 fails in a manner which breaks the chain, then concentrator 241 will detect this and heal the chain internally. The failure of either device 206 or 207 will mean that the other device is removed from the chain by concentrator 241.

Before the above described device chain arrangements can be used, it is necessary to define the topology of the device chain, that is the number of ATM devices in each chain, and the relative physical arrangement of the chain members with respect to each other.

Preferably, the devices which are present are discovered dynamically under the control of the control computer, which sends a particular type of data packet, referred to herein as a "topology discovery packet", through the network directed at device chains. The topology discovery packet passes sequentially through each of the devices in a chain, and returns to the control computer.

The topology discovery packet comprises an array of device identifiers and a value equating to a count. Upon receiving a topology discovery packet, a device in the chain will write its identifier into the packet at a location indexed by the current count. The count is then incremented, and the packet is passed on to the next device in the chain. It is possible that the ATM switch to which the device chain is attached may also participate in this algorithm although this would require the use of a non-standard ATM switch. However, the present invention does not require such participation by the ATM switch, since the device chain is controlled by the control computer.

Referring now back to FIG. 2, the control computer 110 sends a topology discovery packet on what is conventionally known as a "virtual circuit" between it and the device chain ATM switch port 135. Note that in this example, the topology discovery packet must traverse two ATM switches before arriving at the receive interface Rx of the device chain head 105.

In order to direct the data through the network, it is necessary, as with a conventional network, to "provision" the virtual circuit. A variety of mechanisms may be used for provisioning the virtual circuit. The simplest is to use network management procedures to configure a so-called Permanent Virtual Circuit (PVC). The sophistication of these facilities is such that it is possible, using the solutions provided by some ATM networking vendors, for example those supplied by Fore Systems, Inc of Warrendale, Pa., USA, to configure so called Smart PVC's. These are connections in which the client specifies the location and routing identifiers of each of the Smart PVC endpoints, that is, the points at which data originates and terminates. The network management system then uses known dynamic Switched Virtual Circuit (SVC) procedures to establish the connection. If the network management system detects that the SVC between the endpoints is no longer connected, then it is able to attempt to dynamically establish a new SVC between the same endpoints.

In such a way, a virtual circuit is set up between the control computer 110 and the device chain 105–109. The topology packet then passes from the control computer, to the head device 109, and through to the last device 109 on the device chain, and back to the control computer. Software within the control computer is then be able to determine the device chain count, that is the location of each device in the device chain, and also the type of each of the devices. The chain is now ready for initialization, which takes place, at least in part, under the action of the control computer.

First the chain must be initialized according to the number of devices in the device chain in order to establish what is referred to herein as a "loopback capability". Then each device in the chain may be initialized so that each device may communicate through the ATM network independently of other devices in the device chain.

Although the devices may be designed to be manually initialized, for example, with switch settings on each device, according to the number of devices in the chain, the fact that the number of devices on the chain is known by the control computer allows the control computer to perform the first step in initialization. A data packet transmitted through the ATM network comprises information and a header with a standard routing identifier having a Virtual Path Identifier (VPI) and a Virtual Circuit Identifier (VCI). Each local device in the device chain is arranged to pass through data packets to the next device. It is arranged that certain data packets, identified by their routing identifier, are passed through to the next device on the chain, the routing identifier being remapped in a predetermined algorithm by that particular device and in a manner common to all the devices on the chain. Data packets may therefore be looped back through some or all of the devices on the device chain; hence the term "loopback capability".

The control computer software operates with knowledge of how the VPI's will be remapped by the devices, and this greatly simplifies the way in which the computer is programmed. However, it is be possible to implement a "generic loopback capability", which is described later, and so this a priori knowledge is not absolutely necessary in order to implement an ATM device chain according to the invention.

Many different a priori algorithms may be used, however one specific algorithm is described in order to illustrate the technique. For example, each device on the chain is configured to pass through any data packet which has a non-zero VPI to the downstream device but with its VPI decremented by one. A device which receives a data packet with a VPI of zero will use the routing identifier (i.e. VPI and VCI) to direct the data packet to a specific local processing function.

This a priori knowledge is important since it may be used by the control computer to route data packets to specific devices on the chain. It is also used when configuring a chain device to send a data stream onto the ATM network, for example to some remote device. The control software will know how many devices are downstream of the device on the chain and so is able to configure the device to send on a VPI that will be re-mapped by the downstream devices so that when it gets to the ATM switch it has a routing identifier appropriate for routing to the desired destination.

As mentioned above, it is possible to implement a generic loopback capability, in which the local devices are not pre-programmed to modify the routing identifier, but at least the head device is programmed remotely by the control computer to loopback data to the ATM switch. If the loopback capability is generic, then the control computer may reprogram the remapping for any of the devices in the device chain.

In the generic loopback approach, once the topology of the device chain has been discovered the control computer is ready to configure the head device to loopback data packets. In greater detail, this first stage of initialization consists of the control computer sending information to the head device containing mapping instructions. Each mapping instruction specifies an output routing identifier for a specific input routing identifier. Data packets subsequently received by the head device with a routing identifier, that is a VPI/VCI pair, matching the input identifier of one of the mapping instructions previously received by the head device will be forwarded on the transmission interface Tx to the downstream local device or ATM switch with the data packet routing identifier set to be the output routing identifier specified in the matching mapping instruction, and with any information in the data packet unchanged.

This remote programming process may be repeated sequentially for each local device further downstream from the head device, until all devices on the device chain are programmed to pass through data not destined for that particular device. Alternatively, just the head device may be remotely programmed, with subsequent devices operating on predetermined a priori algorithm and either passing through data or responding to information in the data depending on the routing identifier. This latter option is described in more detail below using the rule described above in which a data packet with a non-zero VPI is decremented by one and passed on to a subsequent device, and a data packet with a zero VPI is received by that particular device.

By configuring the head device to loopback so-called "signalling data packets", the control computer is able to implement what is known as the ATM User Network Interface (UNI) signalling protocol on behalf of the chain device(s). In this standard protocol signalling data packets are transmitted bidirectionally between an endpoint and the ATM switch or sequence of switches in order to establish a virtual circuit between a pair of endpoints. The control computer software handles the UNI signalling protocol on behalf of the ATM chain device(s). To the ATM switch to which the device chain is attached, it appears that signalling data packets are being received, interpreted and transmitted by a single local device and so no modifications are required to the standard ATM switch. The fact that the signalling protocol function is interpreted on the control computer is wholly transparent to the ATM switch.

A major advantage of this generic approach is that the devices on the device chain can be made a lot simpler since the local resources that would otherwise be required to implement the signalling functions can be significant in terms of memory and CPU capacity.

The ATM Industry Forum UNI specification specifies that <VPI 0, VCI 5> is the standard routing identifier to use for the Q2931 signalling protocol. Under this protocol, a standard ATM device will interpret any data packet with the routing identifier <VPI 0, VCI 5> to be a signalling data packet. In the present invention, it is necessary that these signalling data packets are passed through to the control computer. For example, if we have a device chain consisting of ten units then the control computer would send the following two mapping instructions to the head device:

VPI 0, VCI 5→VPI 9, VCI N

VPI 0, VCI N→VPI 9, VCI 5 where the input routing identifier is to the left of the arrow and the output routing identifier is to the right of the arrow. The value "N" is a number other than 5 and is the VCI of a provisioned virtual circuit between the device chain ATM switch interface Rx,Tx.

On receiving a signalling data packet (for example originating from a remote device) from the ATM switch transmit interface Tx with <VPI 0, VCI 5> the head device will forward the data packet to the second device on the chain with the routing identifier set to <VPI 9, VCI N>. Using the above-described a priori algorithm, since the VPI is non-zero the second device will automatically forward the data packet to the third device on the chain with a routing identifier set to <VPI 8, VCI N>. This process continues until the final device on the chain receives the data packet which by then has the routing identifier set to <VPI 1, VCI N>. This is then passed to the receive interface Rx of the ATM switch port with a routing identifier set to <VPI 0, VCI N>. Since this is the provisioned routing identifier for a virtual circuit to the control computer, the control computer is able to receive via the ATM switch the signalling data packets sent originally to the device chain. Since these data packets contain signalling information, the control computer may process the signalling information on behalf of the device chain.

If the control computer wishes to send signalling data packets to the ATM switch port on which the device chain is attached then it sends it on the same provisioned virtual circuit that was used above. Each signalling data packet arrives at the head of the device chain with the routing identifier set to <VPI 0, VCI N>. Since this is the routing identifier of a generic mapping instruction in the head device, this data packet is forwarded to the second device in the device chain with its routing identifier changed to <VPI 9, VCI 5>. This data packet gets re-mapped by the chain until it arrives back at the switch port receive interface Rx with the routing identifier set to <VPI 0, VCI 5>. The switch will interpret this data packet as belonging to a conventional signalling data packet.

Since the control computer is able to exchange signalling data packets with the ATM switch on behalf of the device chain it is also able to set up Switched Virtual Circuits (SVCs) on behalf of the device chain.

The second stage in the chain initialization is for the control computer to establish a "management virtual circuit" MVC to each of the devices on the chain. This process requires the use of a native ATM Application Programmer Interface (API) on the control computer and also the use of the ability to loopback signalling data packets. Each MVC will be used to perform device specific management functions, for example configuring a video coder device to start digitizing a particular analogue video input signal.

EXAMPLE 1

To illustrate the process of establishing an MVC an example is worked through using the fourth device on a ten unit chain as the subject of the initialization.

The control computer uses its local ATM API to allocate an address which can be used as a specified endpoint, in effect a virtual endpoint, for signalling data packets. There can be a number of such virtual endpoints within the computer. It is standard to refer to such an address as an ATM Network Service Access Point (NSAP). This NSAP will comprise the ATM network address of the control computer and a locally unused Service Access Point (SAP). The NSAP allocated by the control computer comprises an address which can be written as <NSAP X.Y>, where X is the network address and Y the local SAP.

The control computer then forms a signalling data packet which is a request to establish a duplex SVC connection to the endpoint <NSAP X.Y>. This request data packet is sent on the provisioned virtual circuit used for loopback signalling data packets to the ATM switch port transmit interface Tx to which the head device is connected, arriving at the head device with routing identifier <VPI 0, VCI N>. As previously described the data packet comprising this signalling data packet then pass through the device chain and arrive at the ATM switch port receive interface Rx with the routing identifier set to <VPI 0, VCI 5>. Since this is the routing identifier of a signalling data packet the switch interprets the data packet as a signalling message, which it is, and begins connection establishment procedures, which is as it should be since the signalling data packet is a connection establishment request.

The switch will use standard ATM SVC establishment procedures to route the establishment request to the control computer through any intervening ATM switches that may be on the selected route. The control computer will then receive an indication of the incoming connection request. In order to accept the incoming connection request the control computer sends an SVC establishment complete signalling message to the ATM switch to which it is connected. Information that the connection is established is propagated back to the switch to which the device chain is connected, which then sends a signalling data packet to the head device indicating that the connection is established. However, since signalling data packets are remapped by the head device the control computer will be the ultimate recipient of the SVC establishment complete signalling data packet. This signalling data packet will contain the routing identifier to be used at the device chain switch port for sending and receiving data packets on this SVC.

It is usually the task of the ATM switches to allocate the routing identifier, that is the <VPI, VCI> to be used for each SVC. Since standard signalling data packets are being exchanged, each SVC established by such procedures will have a routing identifier with a VPI of zero, and a VCI which is allocated by the ATM switch.

For example, if the MVC established for the fourth device has a routing identifier of <VPI 0, VCI 239> at the ATM switch port interfaces Rx,Tx to which the device chain is attached, then the control computer may send the following mapping instruction to the head device on the device chain:

VPI 0, VCI 239→VPI 2, VCI 239

Thus if the control computer uses its native ATM API to send a data packet to the device chain on the above SVC then the head device on the chain will forward each data packet to the second device on the chain with a routing identifier set to <VPI 2, VCI 239>. This continues until the fourth device on the chain receives the data packet with a routing identifier of <VPI 0, VCI 239>. Since the VPI is zero, the fourth device knows to interpret the data packet as being destined for local processing by the fourth device.

Since the control computer knows the type of the fourth device (from the above described topology packet discovery process) it is able to arrange that the first data packet sent to the device informs the device of the routing identifier to use in order to send data packets, on the MVC, to the control computer. In this case the fourth device is instructed that the routing identifier for sending data packets on the MVC to the control computer is <VPI 6, VCI 239>. Data packets sent by the fourth device with a routing identifier set to <VPI 6, VCI 239> get remapped by the six succeeding devices on the device chain and arrive at the ATM switch receive interface Rx with a circuit identifier of <VPI 0, VCI 239>. Since this is the routing identifier of the MVC the data packets get routed to the control computer.

Once all the devices on the chain have been initialized in the above manner then the device chain is fully functional.

EXAMPLE 2

In order to further clarify the operation of the ATM device chain invention, an operational example is worked through. For example, consider a chain of devices which are all ATM video coders, that is they take a video signal input and are able to digitize and frame it for transmission on the ATM network. Control software in the control computer may advertise in some manner to other parties on the ATM network, or some other network connected to the ATM network, that it is managing a set of video coders.

The client may have his own ATM NSAP addresses, one of which may be selected to receive video. The client then informs the control software of his selected NSAP and also the video coder device from which he wishes to receive video. The control software may verify that the request was valid, for example, that the client has an account with the control software.

The control software establishes an SVC, using the loopback signalling process previously described, from the device chain to the client NSAP. The control software receives the routing identifier of this SVC as described above. The VPI of the SVC is amended such that it will pass through the devices on the device chain downstream of the selected video coder and arrive at the ATM switch with a VPI of zero. The control software then instructs the requested video coder device (using the device specific control protocol implemented over the MVC to the video coder) to begin transmitting video with the returned VCI and amended VPI as the routing identifier. In this manner the remote client now receives an ATM digital video stream from the requested video coder device on the chain.

EXAMPLE 3

An extension of the above example may be used to further illustrate the breadth of application of the ATM device chain invention. It is likely that a video stream is using a multicast ATM SVC to reach a very large number, for example tens of thousands, of clients. It is possible for the control software to move such a multicast group from one coder on the device chain to another (i.e. a different video input) without breaking the connection to all the clients. This is not possible to achieve using the approach of allocating a single switch port to each video coder device. In order for all of the clients to re-connect to another single switch port video coder a very large number of signalling messages would have to be exchanged with the network. This would lead to a delay before normal service to all parties could be resumed.

Whilst the above examples have illustrated the invention by showing how the VPI part of the standard routing identifier can be used in the loopback algorithm, the standard routing identifier comprises 5 Bytes, 28 bits of which may be used to carry routing information. It is therefore possible to use in a loopback algorithm bits other than those specifically for the VPI part of the routing identifier.

The ATM device chain invention is not limited in application to data packets being transmitted from the device chain. It is possible for data packets over SVCs incoming from the ATM network to be routed to a specific device on the chain. This is done by sending the appropriate mapping instruction to the head chain device for each such SVC. Thus, it is possible to envisage video display device(s) being present on an ATM device chain alongside video coder devices.

Similarly it is possible for application specific virtual circuits between devices on separate chains to be configured as duplex SVCs. For example, consider an ATM device chain member which interfaces to a standard T1 telephone transmission line. An SVC can be established with the appropriate data rate or capacity in order to achieve the necessary so-called Quality-of-Service between two such devices on separate chains. Extra T1 lines may be provided by simply adding additional such devices to the chain.

There are restrictions on the communication paths which are possible between devices which belong to the same ATM device chain. Typically, it is not possible for a device to receive information from a device which is downstream of it. This is because many switches do not allow for incoming data packets to be sent back on the same switch port interface on which they are received. This mode of operation is not defined by the ATM Industry Forum since, until now, there has been no need for ATM data packets to be routed in this manner.

Many devices do not need to communicate with each other. For example, a chain of video coders would be used to transmit a large number of digital video streams out on to the ATM network. There is no need for one video coder on the chain to receive data from any of the others.

For the connection of standard computers, which require to communicate with each other, then the ATM device chain described above may not be appropriate.

One solution to this problem would be to have the device chain ATM switch port participate in the same a priori forwarding algorithm of the chain. In this manner the control software could initialize downstream devices so that data packets transmitted by the downstream devices with the appropriate routing identifier would be received and processed by upstream devices on the same chain.

If the ATM switch port to which the device chain is attached is unable to loop back data packets directly, then this facility can be emulated in a standard ATM switch by use of a second ATM switch port, which would have its transmit interface Tx connected to its receive interface Rx by means of an ATM transmission cable. The ATM switch would be configured (for example, by the control computer) to route data packets from the device chain switch port receive interface Rx to the second switch port transmit interface Tx. The data packets would then be received by the second switch port receive interface Rx, and the ATM switch would also be configured (for example, by the control computer) to route data packets from this receive interface to the transmit interface Tx for the device chain. In general, it will also be necessary to have the switch configured to remap the routing identifiers prior to onward transmission to the head device.

Whilst operational the ATM device chain may have its physical configuration altered. For example, adding or removing a device will cause data packets passed through the chain not to reach their intended destinations. The control computer will receive notice of this either from the ATM signalling protocol or from device specific procedures, e.g no reply is received from a device on the chain within a certain time period. In either case it will be necessary for the topology of the chain to be re-established. Depending on the severity of the change and the implementation of the computer control software it is possible to re-initialize the chain to an empty state or to attempt to preserve as much of the current configuration, that is, the SVCs, as possible when re-initializing the device chain.

The operation of the ATM device chain is dependent on the continual functioning of the control computer. Since the head device of the chain is able to perform generic re-mapping on incoming data packets it is possible to have multiple redundant control computers which are connected to the ATM head device by separate virtual circuits. By the implementation of the appropriate procedures it is possible for one control computer to take over the management of the ATM device chain after the failure of the current control computer.

An ATM network according to the invention offers a significant advance on the method of "stacking" ATM devices that has traditionally been employed in the networking industry. Since the interconnect medium of each device used the standard ATM interfacing technology, the devices can be redeployed as stand-alone units, or however as desired, in a short period of time. Many so-called stacks use a proprietary interconnect technology with one device in the stack being nominated as the interface unit to the standard network format and so the same flexibility of redeployment is not possible.

The invention also offers a significant advance on the "backplane" or "chassis" based solutions for interfacing a number of different device types to the same network interface. When purchasing a chassis solution, the customer has to estimate the final size of their desired configuration. It is also possible that the chassis "slots" that they purchase may be incompatible with later interfaces developed by the manufacturer.

The ATM device chain invention is also important in situations where a number of ATM devices need to be deployed, but it is not desirable to deploy an ATM switch in situ. For example, in many security applications, it is desirable that a number of video coder devices be placed in a location served by a single ATM transmission line.

The invention is also of significance in applications where the devices having to share the same ATM switch port are geographically dispersed. For example, in the security system described above, each of the ATM video coders chained on the single ATM switch port may need to be significant distances apart. The fact that the interconnect technology between the devices uses standard ATM technology means that the inter-device distance is constrained only by the limitations of the particular ATM physical layer employed. The ATM Forum standard for framing ATM data packets over SONET OC3c (at 155 Mbits/s) may currently use multimode fibre, monomode fibre or Category 5 copper physical links. In the case, for example, that multimode fibre was used to link the devices, then each unit could be separated by up to 2,000 m with not intervening regenerator unit. A 16 device chain using multimode fibre links could theoretically extend to 34,000 m in length.

Regarding the generic feedback loop approach in which all devices may be remotely programmed by the control computer, this allows the local devices to be simpler, since they do not have to be programmed with an algorithm for processing the signalling data packets. A simpler device is, of course, cheaper to produce, and this is a particular advantage when multiple such devices are able to share a single switch port as is the case with the ATM device chain approach. New releases of signalling software for generic feedback do not require the device to be upgraded. Rather the software on the control computer, which may be serving as the control node for a large number of end devices, is upgraded.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A network for routing data, the data comprising information and a routing identifier, the network comprising:

a) an ATM switch, the switch having a number of switch ports which may receive and transmit the data, each switch port having a receive interface and a transmit interface, the switch transmitting an interrogation packet having information;

b) a number of ATM devices including a head device, intermediary devices and a last device, the devices each having only a single device port having only a single receive interface and a single transmit interface which may transmit and receive data, respectively, and each device being adapted to distinguish between the information and the routing identifier, the devices being connected in series to each other in a device chain through each respective transmit interface of a device connected to the receive interface of the next device in the device chain and to a first switch port only through the head device and the last device so that the first switch port may transmit data from its transmit interface to the receive interface of the head device and the receive interface of the first switch port may receive data from the transmit interface of the last device and so that data may be transmitted from the head device through to any succeeding device through any intermediary devices in the device chain, each device receiving the interrogation packet in turn and modifying information in the interrogation packet to record its identity and count in the device chain; and c) a controller which may be programmed with the identities of the ATM devices and which may communicate through the first switch port with a device in the device chain through any intermediary devices in the device chain;

in which an ATM device may be programmed with mapping instructions so that data subsequently received by the device may be correctly routed according to the routing identifier.

2. A network as claimed in claim 1 in which the controller is built into the ATM switch.

3. A network as claimed in claim 1 in which the controller is a control computer which may communicate with a second ATM switch port and which may be programmed with the identities of the ATM devices.

4. A network as claimed in claim 3 in which the controller may dynamically interrogate the device chain in order to determine the identities of the devices.

5. A network as claimed in claim 4 in which the mapping instructions may be programmed remotely with information transmitted to the device chain through the ATM switch.

6. A network as claimed in claim 5 in which the mapping instructions may be programmed remotely by the controller.

7. A network as claimed in claim 6 in which the controller may transmit data with information comprising mapping instructions through the ATM switch to the head device, at least the head device being adapted to recognize the routing identifier as being valid or invalid, and in response to a valid routing identifier to store the mapping instructions so that data subsequently received by the device may be correctly routed according to the routing identifier.

8. A network as claimed in claim 7 in which the network comprises a remote ATM device and the controller is adapted to provision a virtual circuit between the remote device and a device in the device chain in order that data may be transmitted between the remote device and the device in the device chain.

9. A network as claimed in claim 8 in which the network comprises a concentrator, the concentrator having a series of input and output ports, the ports being adapted to transmit data and being interposed between the first switch port and the device chain, so that data may be transmitted to and received from the device chain through the concentrator.

10. A method of routing data through a network, the data comprising information and a routing identifier, the network including an ATM switch, the switch having a number of switch ports which may receive and transmit the data, each switch port having a receive interface and a transmit interface; the network further including a number of ATM devices including a head device, intermediary devices and a last device, the devices each having only a single device port having only a single receive interface and a single transmit interface which may transmit and receive data, respectively, and each device being adapted to distinguish between the information and the routing identifier, the devices being connected in series to each other in a device chain through each respective transmit interface of a device connected to the receive interface of the next device in the device chain and to a first switch port only through the head device and the last device so that the first switch port may transmit data from its transmit interface to the receive interface of the head device and the receive interface of the first switch port may receive data from the transmit interface of the last device and so that data may be transmitted from the head device through to any succeeding device through any intermediary devices in the device chain; and the network further including a controller which may be programmed with the identities of the ATM devices and which may communicate through the first switch port with a device in the device chain through any intermediary devices in the device chain; the method comprising the steps of:

transmitting an interrogation data packet from the controller via the ATM switch to the device chain;

receiving the data packet at each device in the device chain in turn, each device modifying information in the data packet to record its identity and count in the device chain, prior to onward transmission of the data pack;

transmitting the interrogation data packet from the last device in the device chain via the ATM switch to the controller;

receiving the interrogation packet at the controller in order to program the controller;

programming the controller with the number and location of the devices in the device chain; and programming the devices in the device chain so that data destined for a particular device in the device chain may be received and acted upon by that device, and so that data not destined for a particular device may be transmitted onward by that particular device to the next device in the device chain.

11. A method as described in claim 10 in which the devices in the device chain may be remotely programmed by the controller, comprising before the programming the devices step there are the steps of transmitting a mapping instruction from the controller via the ATM switch to a particular device in the device chain; and receiving the mapping instruction at the particular device in the device chain in order to program the particular device.

* * * * *